(12) United States Patent
Klein

(10) Patent No.: US 7,991,787 B2
(45) Date of Patent: Aug. 2, 2011

(54) APPLYING SEARCH ENGINE TECHNOLOGY TO HCM EMPLOYEE SEARCHES

(75) Inventor: Udo Klein, Maximiliansau (DE)

(73) Assignee: SAP AG, Walldorf (DE)

( * ) Notice: Subject to any disclaimer, the term of this patent is extended or adjusted under 35 U.S.C. 154(b) by 1857 days.

(21) Appl. No.: 10/931,729

(22) Filed: Aug. 31, 2004

(65) Prior Publication Data

US 2006/0059122 A1    Mar. 16, 2006

(51) Int. Cl.
*G06F 17/30*    (2006.01)

(52) U.S. Cl. ........ 707/780; 707/706; 707/713; 707/722; 707/736; 707/758; 707/769; 707/781; 705/1; 382/149

(58) Field of Classification Search .................. 707/3–6, 707/10; 704/7; 709/206; 345/588
See application file for complete search history.

(56) References Cited

U.S. PATENT DOCUMENTS

| 5,303,361 | A  | * | 4/1994 | Colwell et al. ..................... 707/4 |
| 5,740,421 | A  | * | 4/1998 | Palmon ............................. 707/4 |
| 5,786,819 | A  | * | 7/1998 | Weiser et al. ................. 715/840 |
| 6,032,145 | A  | * | 2/2000 | Beall et al. ........................ 707/5 |
| 6,070,160 | A  | * | 5/2000 | Geary ............................... 707/4 |
| 6,292,894 | B1 | * | 9/2001 | Chipman et al. .............. 713/168 |
| 6,691,105 | B1 | * | 2/2004 | Virdy ................................ 707/3 |
| 2002/0032740 | A1 | * | 3/2002 | Stern et al. ..................... 709/206 |
| 2003/0065660 | A1 | * | 4/2003 | Lau et al. .......................... 707/5 |
| 2004/0054666 | A1 | * | 3/2004 | Lapir et al. ....................... 707/3 |
| 2004/0100956 | A1 | * | 5/2004 | Watanabe .................... 370/389 |
| 2006/0031215 | A1 | * | 2/2006 | Pong Robert .................... 707/4 |

OTHER PUBLICATIONS http://citeseer.ist.psu.edu/10419.htm.
http://www.codeproject.com/string/dmetaphone6.asp.
http://www.searchsoftware.com/fuzzy-name-matching.html.
http://odur.let.rug.nl/~kleiweg/lev/levenshtein.html.
http://www.wbrogden.com/phonetic/notice.html.
http://www.merriampark.com/ld.htm.
Hicks, M., et al., "Dynamic Software Updating," Conference on Programming Language Design and Implementation, Proceedings of the ACM 2001, pp. 13-23, 2001.
Popovici, A., et al., "Just-In-Time Aspects: Efficient Dynamic Weaving for Java," in Proceedings of the 2nd international conference on Aspect-oriented software development, pp. 100-109. ACM Press, 2003.
Chiba, S., et al., "Using HotSwap for Implementing Dynamic AOP Systems," European Conference on Object-Oriented Programming 2003 Workshop on Reflective Object-Oriented Programming and Systems, Darmstadt, Germany, Jul. 2003.
Valetto, G., et al., "A Mobile Agent Approach to Process-based Dynamic Adapation of Complex Software Systems," 8th European Workshop on Software Process Technology, Aug. 2001.
Andersson, J., et al., "Dynamic Deployment of Java Applications," in Java for Embedded Systems Workshop, London, May 2000.

(Continued)

*Primary Examiner* — Syling Yen
(74) *Attorney, Agent, or Firm* — Kenyon & Kenyon LLP

(57) ABSTRACT

The present system provides an efficient and reliable method for name searching within an employee records database. The present invention uses a plurality of different searching algorithms such as an exact algorithm and a fuzzy algorithm. The exact algorithm is used to provide a first set of a limited number of results from the entire employee database. The fuzzy algorithm is then used to search through only the first set of results to quickly provide a ranked results list of employee names that is displayed to a user. The user is then able to select the appropriate name from the results list for further processing.

20 Claims, 15 Drawing Sheets

OTHER PUBLICATIONS

Bettini, L., et al., "Software Update via Mobile Agent Based Programming," in Proceedings of the 2002 ACM Symposium on Applied Computing, Madrid, pp. 32-36, 2002.

Slowikowski, P., "Comparison Study of Aspect-oriented and Container Managed Security," AAOS2003: Analysis of Aspect Oriented Software, ECOOP 2003 Darmstadt, Germany, 2003.

* cited by examiner

Data Broswer: Table LXYVPDIRV Select Entries   200   SAP

Data Broswer: Table LXYVPDIRV Select Entries   200

Table         LXYVPDIRV
Displayed fields  4 of  4        Fixed Columns                              2 List WIDTH-0250

| | FIRXTNIDI | LASTNIDX | FIRST NAME | LAST NAME |
|---|---|---|---|---|
| | 1 | 10.400 | A | JAWAHAR |
| | 2 | 4.362 | A. PAUL | DAVIDSON |
| | 3 | 12.564 | A.ANAND | KUMAR |
| | 4 | 14.167 | A.K. | MAITHILI |
| | 5 | 25.578 | AAD | WOLF |
| | 6 | 16.343 | AALBERT | NIET |
| | 7 | 363 | AARON | ALONSO |
| | 7 | 4.650 | AARON | DENNIS |
| | 7 | 7.672 | AARON | GOH |
| | 7 | 19.710 | AARON | LONG |
| | 7 | 14.369 | AARON | MANI |
| | 7 | 18.278 | AARON | PRATT |
| | 7 | 18.358 | AARON | PRITZLAFF |
| | 7 | 18.529 | AARON | QUINN |
| | 7 | 19.861 | AARON | RENKEN |
| | 7 | 19.520 | AARON | ROSE |
| | 7 | 21.778 | AARON | SMITH |
| | 8 | 293 | AARON D | ALBUREY |
| | 9 | 14.614 | AARTHI | MATHIVANAN |
| | 10 | 9.038 | AASA | HELLBERG |
| | 10 | 10.543 | AASA | JONSSON |
| | 11 | 6.780 | AB | FROHWEIN |
| | 12 | 2.455 | ABDEL | BOUDA |
| | 13 | .26 | ABDEL HAKIM | ABBAS |
| | 14 | 10.209 | ABDELGHANI | IZEM |
| | 15 | 11.333 | ABDELHADI | KHOURI |
| | 16 | 16.276 | ABDELHAK | NEZZARI |
| | 17 | 25.771 | ABDELHAMID | YASBAH |
| | 18 | 12.719 | ABDELLAH | LAARICH |
| | 19 | 13.788 | ABDELLATIF | LOURHNIMI |
| | 20 | 5.699 | ABDELMORHIT | EL RHAZI |
| | 21 | 918 | ABDERRAZZAK | AZIRHI |
| | 22 | 15.462 | ABDIRISAK | MOHAMED |
| | 23 | 14.708 | ABDOLVAHED | MAVAJI |
| | 24 | 16.008 | ABDUL | NAJIMUDEEN |
| | 24 | 16.849 | ABDUL | RAZACK |
| | 24 | 21.068 | ABDUL | SHIJU |
| | 25 | 4.297 | ABDULBAHRI | DANIS |
| | 26 | .265 | ABDULLAH | AL-NAMI |
| | 26 | 9.048 | ABDULLAH | HELMI |
| | 27 | 6.409 | ABDULWAHAB | FIRFIRAY |
| | 28 | 10.897 | ABEL | INIGUEZ |
| | 28 | 23.866 | ABEL | TARRES |
| | 29 | 19.563 | ABHAY | JOSHI |
| | 29 | 23.429 | ABHAY | TIPLE |
| | 30 | 3.650 | ABHIJEET | CHOWDHURY |
| | 30 | 25.765 | ABHIJEET | YARDE |
| | 31 | 2.374 | ABHIJIT | BORA |

80   82   84   ▷   L6B (1) (000)   Is0096   INS

*Display Personal Data*

Person no.
EE group
EE subgroup
Start

Name
| | | |
|---|---|---|
| Title | Mrs | Title |
| Last Name | Muller | Initials |
| First Name | Anja | OtherTitle |
| Name prefix | | |
| Formatting | Anja Muller | Spec format 09 |

Birth data
| | | |
|---|---|---|
| Name AtBirth | | Title |
| Name affix | | |
| Birthdate | 05.88.1968 | Birthplace Freiburg |
| Comm. lang | English | City o birth Germany |
| Nationality | American | 2nd Nation |

Marital status
| | | |
|---|---|---|
| Mar status | Mental Since | Religon |
| No child | | |

APPLYING SEARCH ENGINE TECHNOLOGY TO HCM EMPLOYEE SEARCHES

CROSS-REFERENCE TO RELATED APPLICATION

This application is related to U.S. patent application Ser. No. 10/931,929, filed concurrently herewith, and incorporated herein by reference.

FIELD OF THE INVENTION

The present invention is related to database searching technologies and more particularly to fuzzy-logic database searching.

BACKGROUND OF THE INVENTION

The recent advent of electronic word processing has created an increased need for automated searching of words and phrases in electronic databases. Search engines like Google, for example, operate on short phrases or individual words that are input by an operator. The search engine then searches one or more databases looking for words or phrases similar to the query. The results of the search query are then displayed to an operator.

There are some prior art techniques used in search engines that allow for some ambiguity of the query words. This provides a tolerance for misspellings and other errors that often cause the search engine to return with no results or irrelevant results. These types of techniques are commonly referred to as "fuzzy" searches.

Fuzzy searches generally take longer to complete than exact searches as the searching algorithms must consider many more combinations of letters while searching the database. The list resulting from a fuzzy search tends to be more time consuming for an operator to consider as more results are typically provided.

Furthermore, fuzzy searches may also operate on phonetic spellings and predetermined groups of characters, which also increase the database searching times, while rendering the searching techniques to be limited to a specific language.

In English for example, a "ph" is commonly pronounced as an "f", so fuzzy searching algorithms written for an English database, may replace "ph" for "f" (and vice versa) when comparing the queried word to the possible candidate words in the database. Fuzzy searches in a Spanish or German database where a "ph" is replaced with an "f" (and vice versa) would yield inappropriate results, while further adding to the searching time.

Searching for names within a database of employee information has also become a common task. For example, FIG. 1 shows a screen shot 10 using a system for searching employee names. By "screen shot" it is meant that an image displayed on a screen of a computer or the like at a particular point in time is reproduced as a figure. In this type of system, the first and last name are entered in two separate fields 12 and 14. The searching algorithms employed in this exemplary system may be similar to those contained in Internet searching engines.

For example, to search for the employee "Jim Meyer", a prior art search query may be First Name "?im", Last Name "Me?er". Again this type of fuzzy searching allows for name misspellings and other related errors, that might cause the search engine to return with no or erroneous results. Furthermore, this type of engine searches the database for the first name and last name as separate words. By searching the names as separate words, a quick list of results is obtained, however the results list tend to be lengthy and inaccurate.

There are many research papers on searching for proper names in databases as the best method for doing this remains an open question, see for example the World Wide Web address of "codeproject.com/string/dmetaphone6.asp" and the Internet address of "citesser.ist.psu.edu/10419.html." Current prior art search engine techniques for searching for names have substantial drawbacks. Further, these current and limited searching techniques are not found in email, workflow and groupware applications.

SUMMARY OF THE INVENTION

An embodiment of the present system provides an efficient and reliable method for name searching within a database. The exemplary searching techniques are applicable to databases of all languages. Other embodiments of the present invention use a plurality of different searching algorithms such as an exact algorithm and a fuzzy algorithm, wherein the name is searched as one single text string. The exact algorithm is used to provide a first set of a limited number of results from the entire database. The fuzzy algorithm is then used to search through only the first set of results to quickly provide a ranked results list that is displayed to a user. The user is then able to select the appropriate name from the results list for further processing.

An exemplary exact algorithm used in the present system contains a process that detects the number of trigrams within the queried name string and compares the result to the database of names. The fuzzy algorithm used to search through the first set of results contains a process that searches for diagrams and further calculates a Damerau Levenshtein (DL) distance. A ranking is calculated for each result using a (DL) distance score and a diagram score. In addition to displaying the ranked results list to the user, various other types of data are displayed. These other types of data include the number of digrams and trigrams found within a name, the search runtime, and also the DL distance.

Another embodiment of the present invention provides a search engine, employee database and HCM application used in conjunction with the operators computer to provide a platform on which to enact the above mentioned algorithms and methods. Further, in another embodiment of the present invention, the employee name searching algorithms are contained in programming code segments that enable the present invention to be used in the computer environment as described herein.

It will be appreciated that the present invention is described below using specific examples that are not intended to limit the invention. The systems and methodology may be applied to a broad range of other applications. Therefore these and other advantages of the present invention will become apparent to those skilled in the art upon a reading of the following detailed description and a study of the drawing figures.

BRIEF DESCRIPTION OF THE DRAWINGS

FIG. 8A is a screen shot illustrating the directory of names stored within an embodiment of the employee name searching system of the present invention;

FIG. 13 illustrates an exemplary employee record stored in the database of an embodiment of the present invention.

DETAILED DESCRIPTION OF THE PREFERRED EMBODIMENT(S)

In one embodiment, the present system provides an efficient and reliable method for name searching within an employee database wherein the name is searched by the system as a single text string. The exemplary name searching techniques are applicable to databases of all languages. The present invention preferably uses multiple searching algorithms such as an exact algorithm and a fuzzy algorithm. The exact algorithm is used to provide a first set of a limited number of results from the entire database. The fuzzy algorithm is then used to search through only the first set of results to quickly provide a ranked results list that is displayed to a user. Various exemplary embodiments of the present system and methods are described below with reference to FIGS. 2-13.

Figure 1:
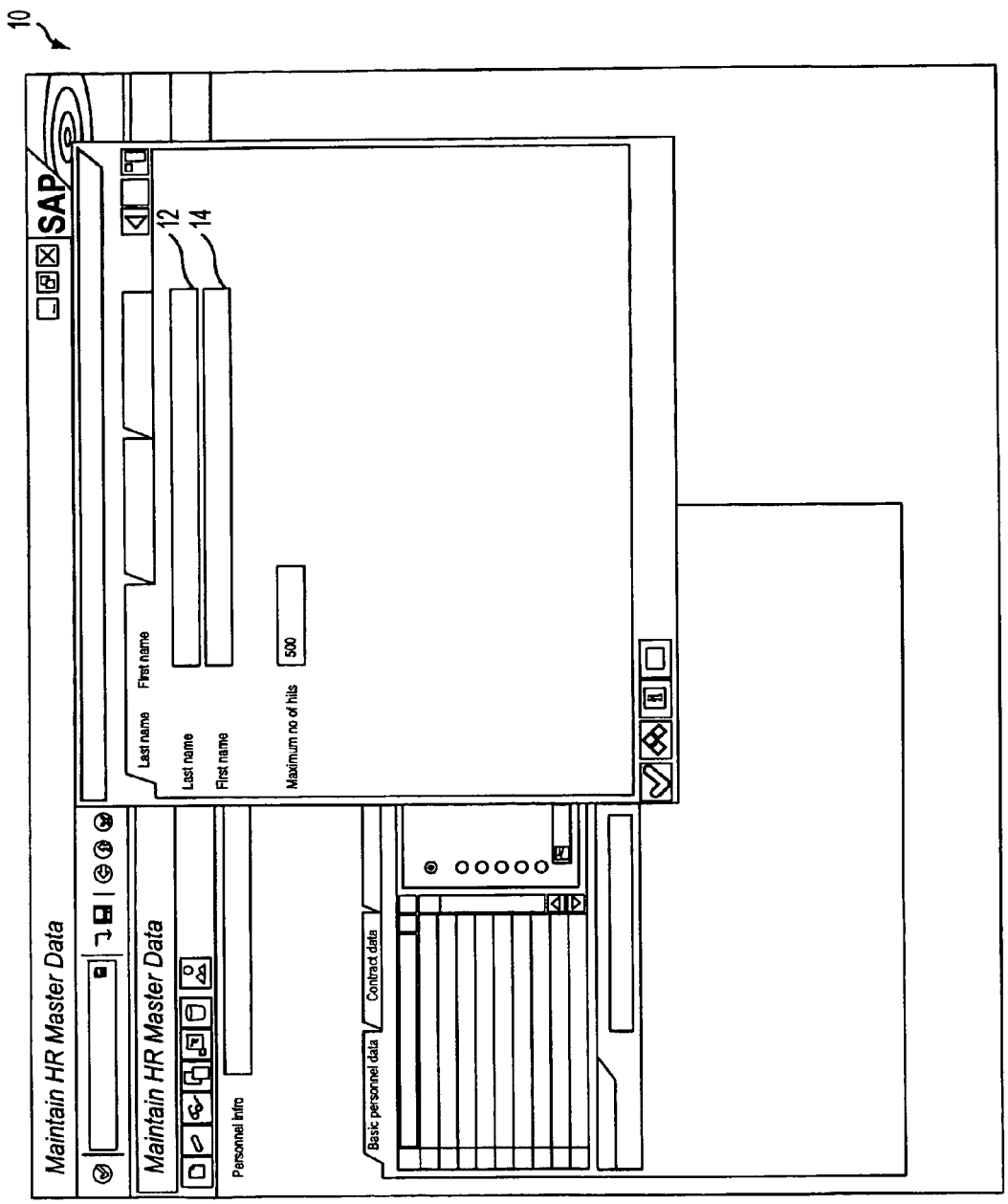
FIG. 1 shows a screen shot of an employee name searching system.
Figure 2:
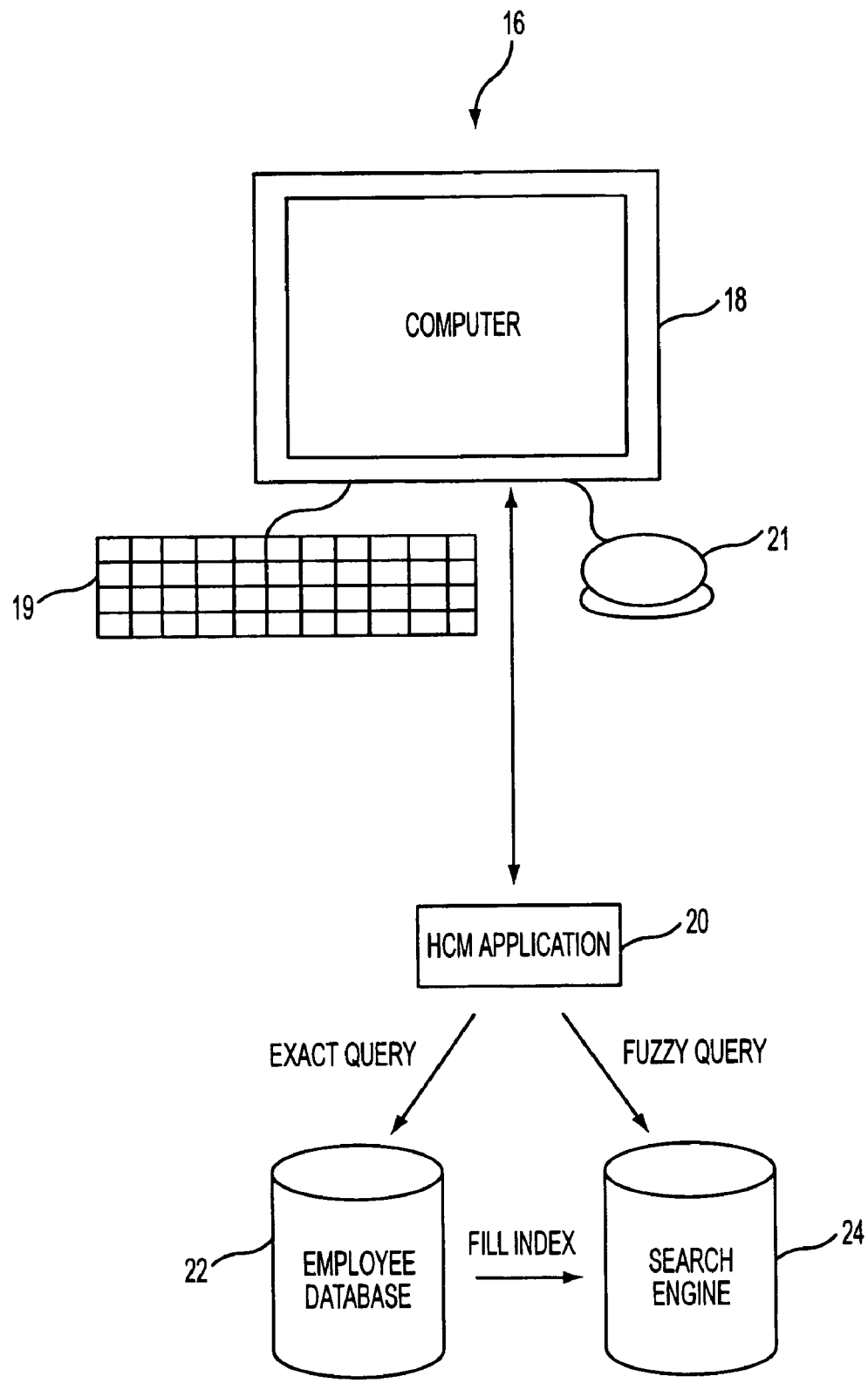
FIG. 2 illustrates an exemplary embodiment of an employee name searching system of the present invention.

FIG. 2 is a schematic diagram 16 of the employee name searching system of the present invention. The exemplary system 16 includes a computer 18, an HCM application 20, an employee database 22 and a search engine 24. The computer 18 preferably includes standard features such as a monitor 17 (aka "screen" or "display") for viewing data, a keyboard 19 and mouse 21 or the like for entering data, and a computer unit 23 including, for example a microprocessor. It is also noted that more than one computer may be included within this system 16 as is conventional.

The HCM application 20 is a human resource type of application as is conventional. The employee database 22 stores all the names of the employees as entered into the system through, for example, the computer 18. The database 22 is also maintained to contain an updated index of other searchable data such as digrams and trigrams as will be subsequently described with reference to FIG. 7A. The search engine 24 is provided to search the employee database as controlled by the system 16. The search engine 24 may be a TREX type of search engine for example.

The embodiment of the present system as shown in FIG. 2 would therefore be controlled by programmed computer code segments to perform employee name searches as described with reference to FIGS. 3-13. The structures and elements described in FIG. 2 therefore provide the means and apparatus necessary to perform the functions described below.

Figure 3:
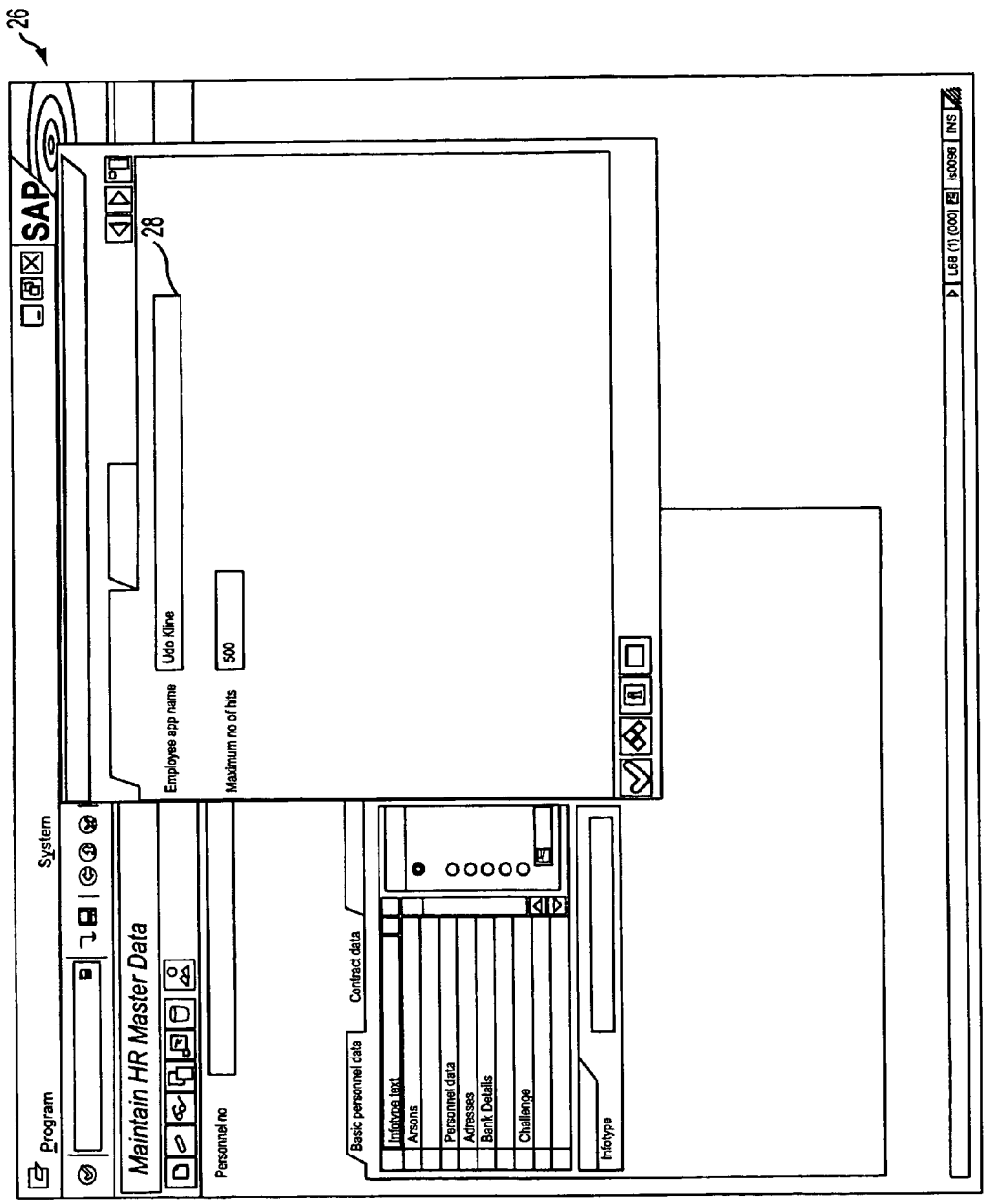
FIG. 3 is a screen shot of an employee name searching system of an embodiment of the present invention.

FIG. 3 shows a screen shot 26 employed by an embodiment of the present system, where the user is prompted to enter the queried full name of the employee that is the subject of a search. The input screen 26 is preferably provided on the monitor connected to computer 18. Input box 28 of input screen 26 receives the full name (First and Last) as a single text string. In this example the name "Udo Kline" is searched in the employee database 22. The name in this example is deliberately incorrect (it should be "Udo Klein").

Figure 4:
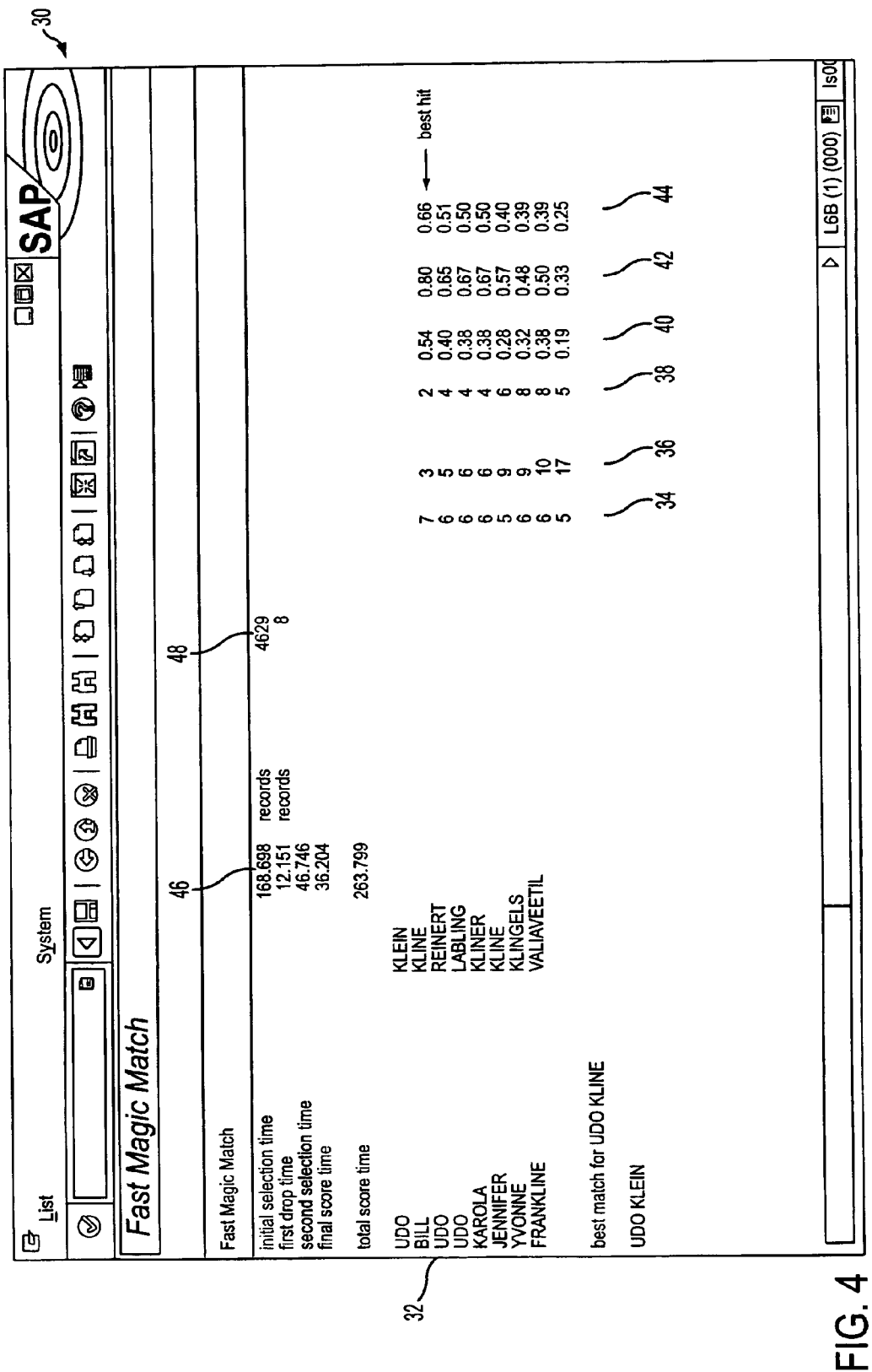
FIG. 4 is a screen shot illustrating the results of the employee name searching system of an embodiment of the present invention.

The results of the search in FIG. 3 are shown in FIG. 4. FIG. 4 shows a ranked results screen shot 30 provided by an embodiment of the present system.

List 32, in this example, ranks the top 8 results searching the employee database for the name "Udo Kline". In this example the correct name "Udo Klein" is the best match in the database to the search query name "Udo Kline".

Columns 34-44 show various types of data regarding the searching methods of the present system. For example column 34 shows the number of digram hits in the employee name, column 36 shows the number of digram mismatches in the employee name, column 38 shows the Damerau Levenstein (DL) distance of each result. Columns 40 shows a digram score, column 42 shows a DL distance score, and column 44 shows a total score ranking. Information 46 shows the various search times (in microseconds) using the present methods, while 48 details the total number of employee records searched (4629) and the number of final results displayed (8).

The columns of data displayed in FIG. 4 are calculated from an exemplary searching algorithm that involves a combination of techniques. These techniques involve searching digrams and trigrams and calculating a (DL) distance. As well known to those skilled in the art, a "digram" is a string of 2 consecutive letters, and a "trigram" is a string of 3 consecutive letters. By "distance" it is meant herein the number of differences in letters between a subject word and a target word. For example, a trigram of 3 letters at a time is produced from the input text string name and compared with the names in the database. The first name "Udo" produces 3 trigrams padded with spaces (_ud, udo, do_). These 3 trigrams are then searched throughout the database. Digrams of 2 letters are searched throughout the name database in a similar manner as the trigrams as explained above. The specific formulas and algorithms used to produce the data shown in FIG. 4 are contained and described in greater detail with respect to FIGS. 9-11.

Figure 5:
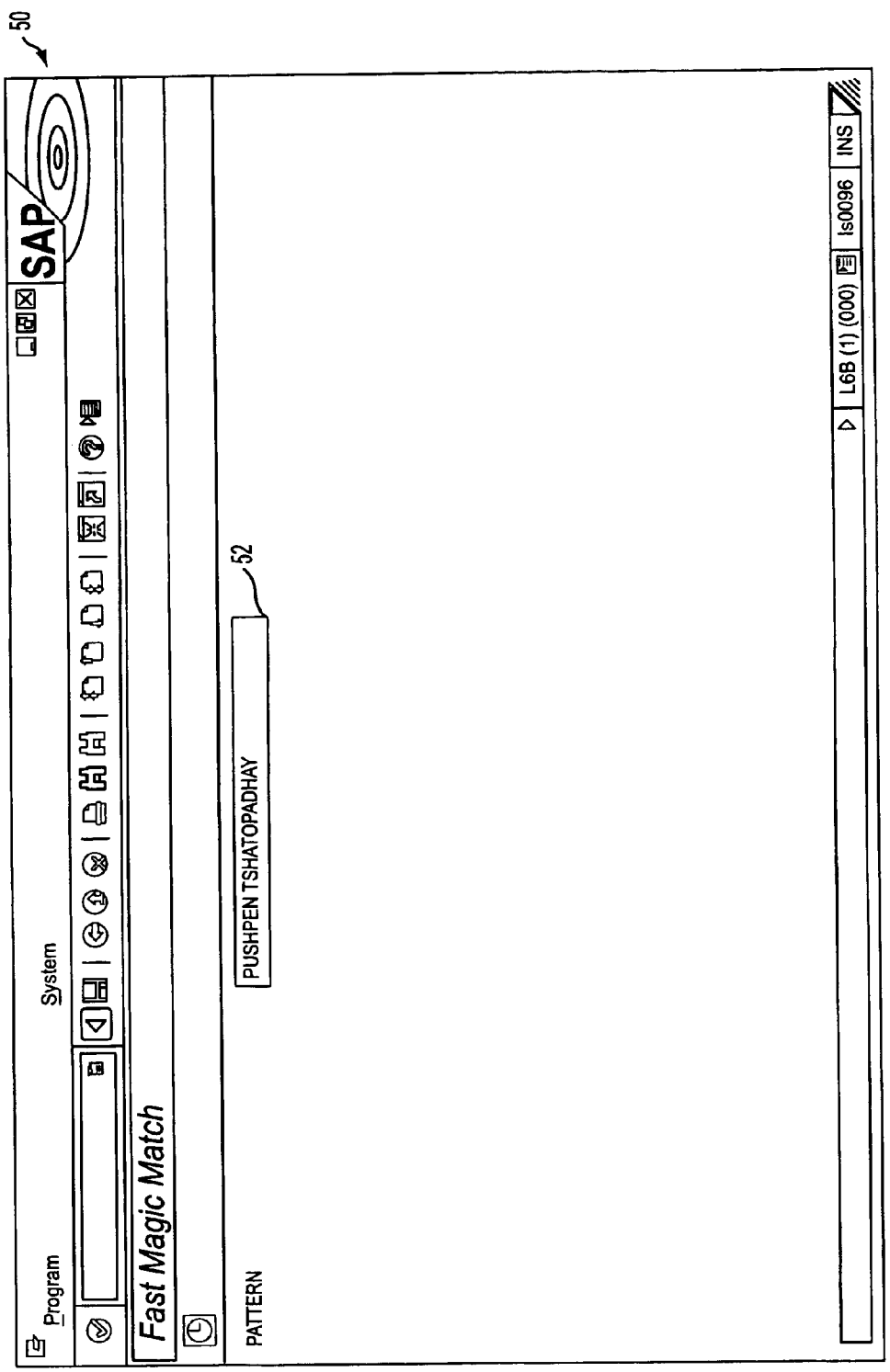
FIG. 5 is a screen shot illustrating an example of the employee name searching system of an embodiment of the present invention.
Figure 6:
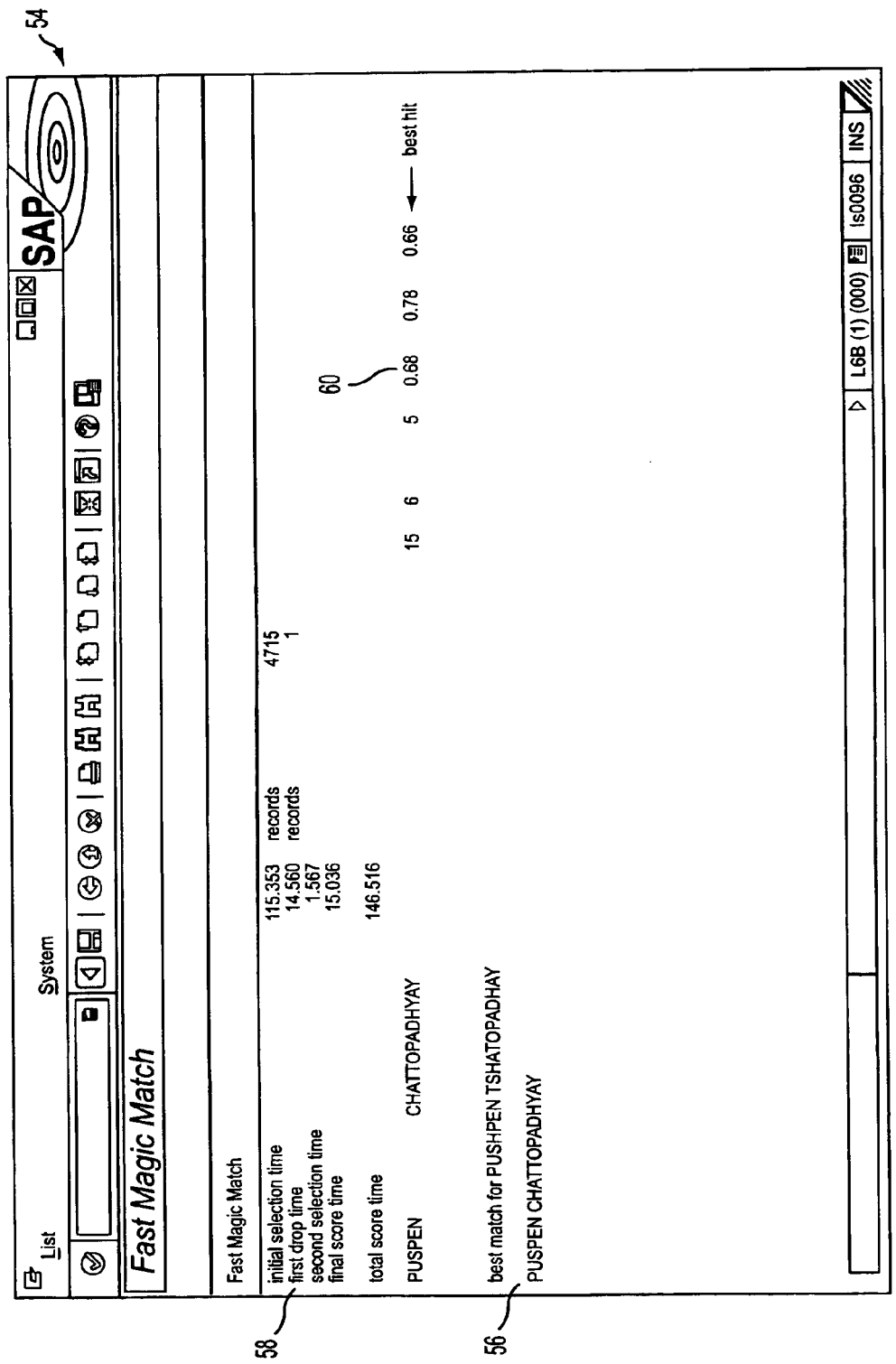
FIG. 6 is a screen shot illustrating an example of the results of the employee name searching system of an embodiment of the present invention.

FIG. 5 shows another screen shot 50 provided by the present system. In this example the name "Pushpen Tshatopadhay" is searched in the employee records database. The name is entered into input box 52 by the operator using the computer 18 for searching purposes. FIG. 6 shows another ranked results screen shot 54 as provided by an embodiment of the present system for the name search as shown in FIG. 5. In this example the best match 56 for the name "Pushpen Tshatopadhay" has been found and is displayed to the operator. In this case "Pushpen Chattopadhyay" is the only result displayed. Displayed information 58 shows the search times in microseconds while searching through the employee database using the present methods. Information 60 details the scores of digrams and DL distances in the same manner as FIG. 4. In this example, only one name is displayed, as the first searching algorithm found only one result that met the predetermined criteria of trigram scores.

Figure 7A:
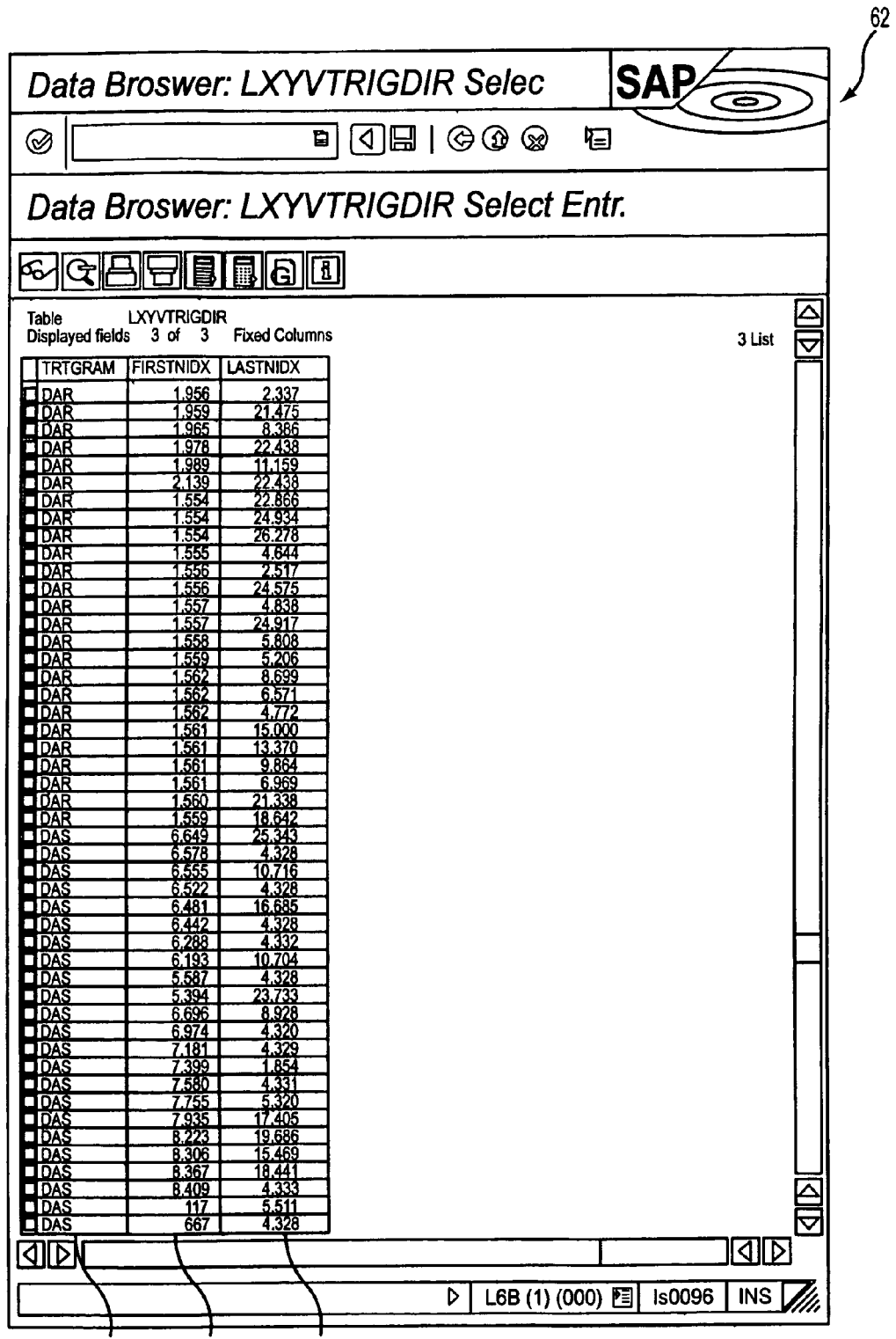
FIG. 7A is a screen shot illustrating a trigram index of an embodiment of the employee name searching system of the present invention.
Figure 7B:
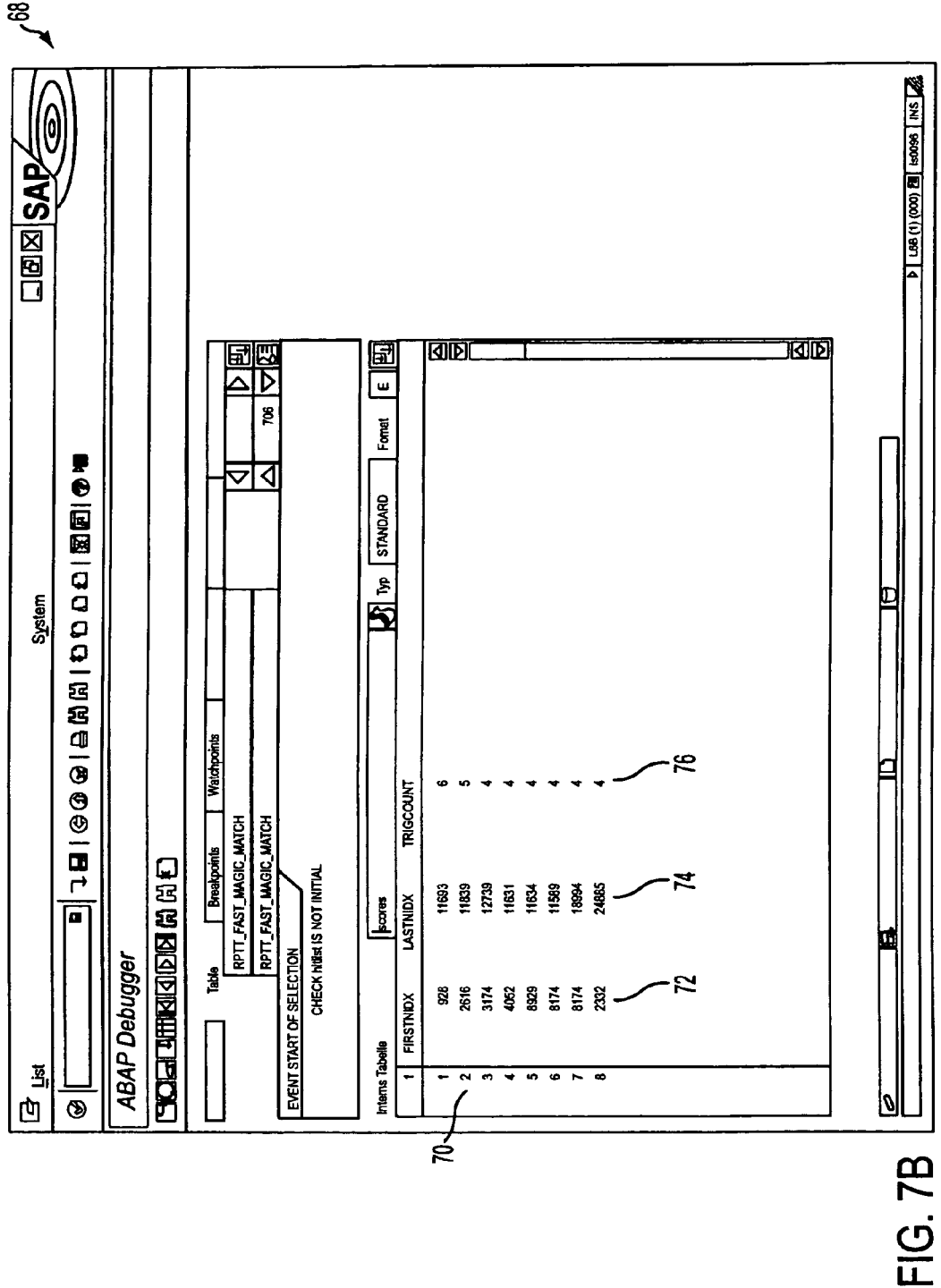
FIG. 7B is a screen shot illustrating a trigram score results of an embodiment of the employee name searching system of the present invention.

FIG. 7A is a screen shot 62 of the trigram index as used in the first exemplary searching algorithm of the present invention. Column 63 contains the trigram combination of letters, "DAR" and "DAS" as shown. Column 64 represents the trigram score of the first name, while column 66 shows the trigram score for each last name. These index numbers represent the occurrences of trigrams "DAR" and "DAS" in both the first and last names. All possible combinations of trigrams are stored in the employee database as shown in FIG. 2. This index is accessed to create the first selection set of names from the employee database. FIG. 7B shows a screen shot 68 of the trigram scores as provided by the present system. The ranked list 70 contains column 72 that shows the trigram score of the first name, while column 74 shows the trigram score for each last name. Column 76 ranks the number of trigram hits for each of the ranked records found in the database.

Figure 8B:
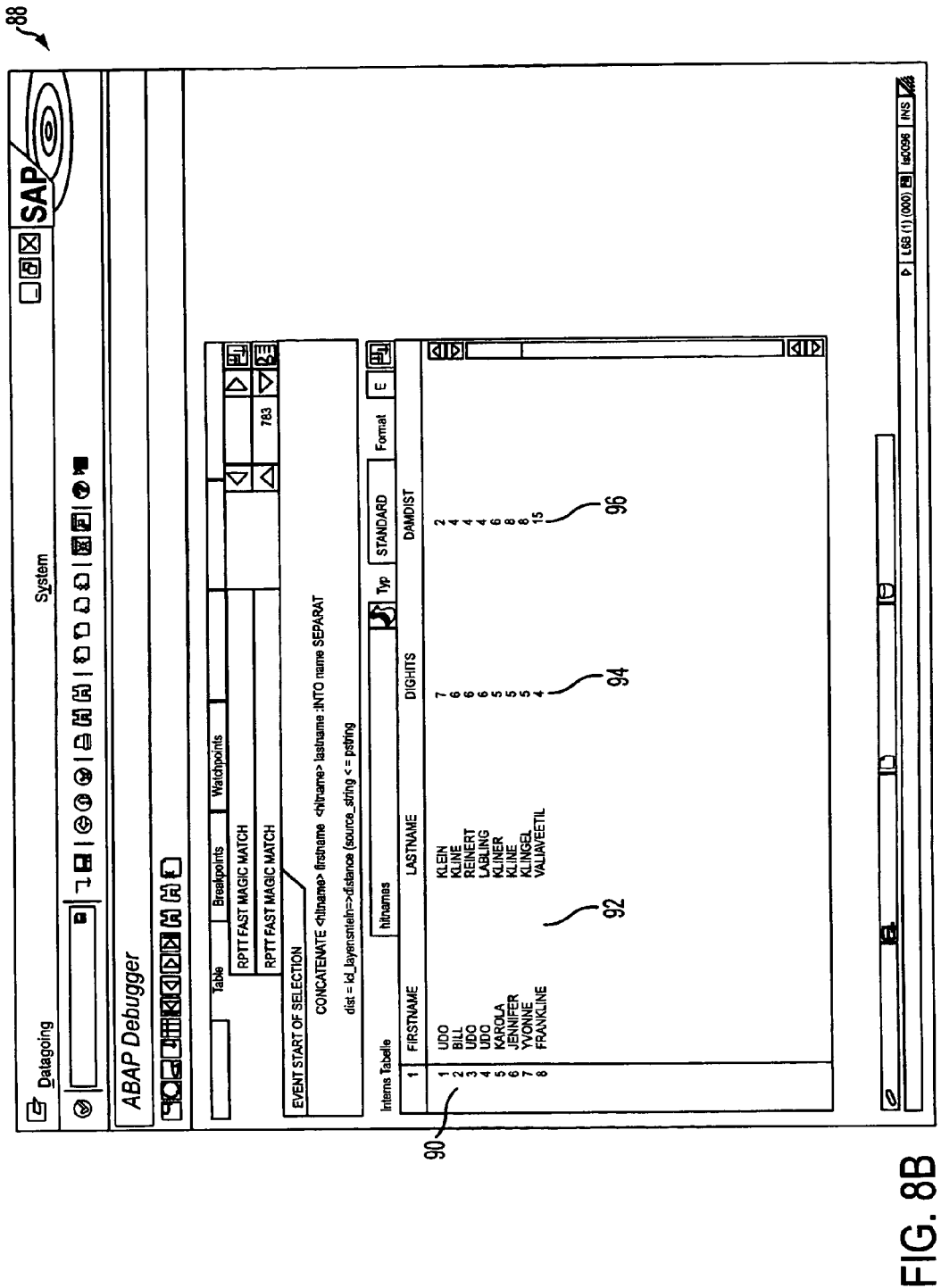
FIG. 8B is a screen shot illustrating results of the searching algorithms of an embodiment of the present invention.

FIG. 8A is a screen shot 78 of the name directory provided by an embodiment of the present system. Column 80 represents the trigram score of the first name, while column 82 shows the trigram score for each last name. Columns 84 and 86 contain the first and last names of the employees. FIG. 8A therefore shows an example of how the present invention connects the names stored in the database to the index numbers as produced by the search engine. FIG. 8B shows the results 88 of a digram search as provided by the exemplary fuzzy algorithm of the present system. The ranked list 90 contains columns 92 that show the first and last names of the best hits. Column 94 shows the digram score of the first name, while column 96 shows the DL distance score for each name. These results 90 are therefore produced using the second fuzzy algorithm using the first selection set of names produced by the exemplary first searching algorithm as described above.

Figure 9:
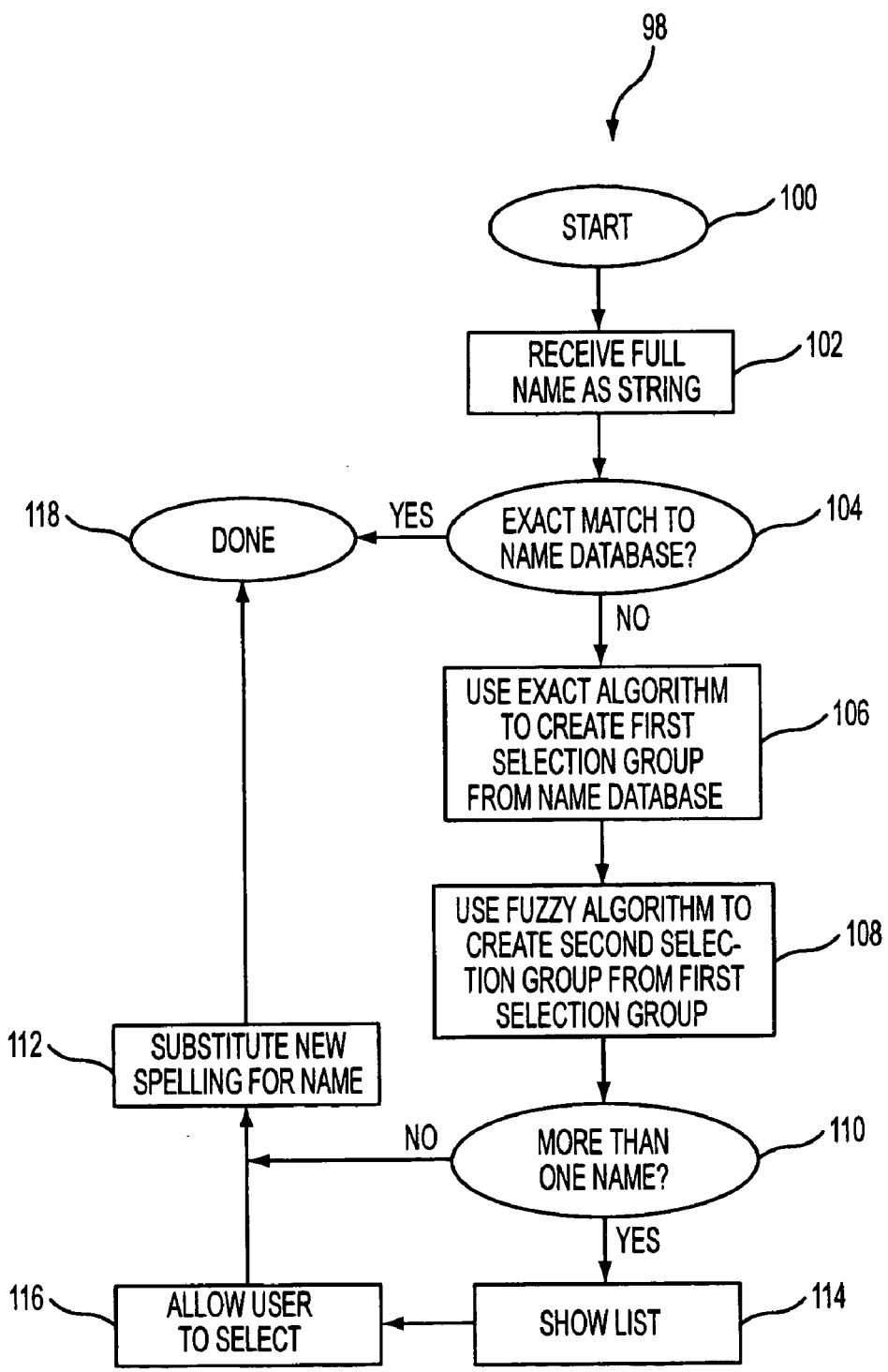
FIG. 9 is a flow diagram illustrating a name searching process of an embodiment the present invention.

FIG. 9 is a flow diagram illustrating the steps in an exemplary searching process 98 of the present invention. As described above, the process 98 is enabled by the system as shown in FIG. 2, which includes computer code segments. The process starts in step 100 and then in step 102 the first and last name of the searched employee is received as a text string. In step 104 it is determined if an exact match in the employee database is found. If an exact match is found (YES in Step 104), the process is done and the result may be displayed to the operator as shown in FIG. 4. If an exact match is not found (NO in step 104) the process continues in step 106 where an exact algorithm is used to create a first selection group from the name database. The details of this exact algorithm are described with reference to FIG. 10. In step 108 the searching process continues using a fuzzy algorithm to create a second selection group from the first selection group. The details of this fuzzy algorithm are described with reference to FIG. 11. In step 110 it is determined if more than one name exists in the results of steps 108 and 110. If there is not more than one name (NO in step 110) the process continues in step 112 where a new spelling is substitutes for the queried name. If there are more than one possible matching names found (YES in Step 110), the ranked list of names is displayed to the operator in step 114. In step 116 the user is allowed to select a name from the displayed list. The process then substitutes this new spelling for the queried name in step 112, and then the process is done in step 118.

Figure 10:
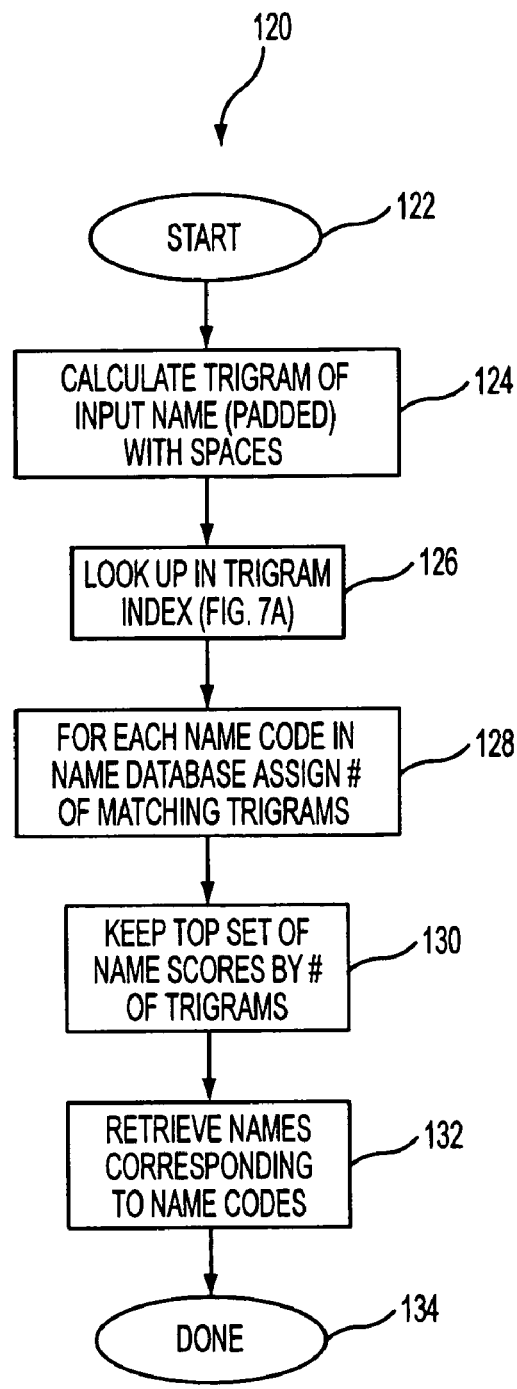
FIG. 10 is a flow diagram illustrating a first exemplary searching algorithm of the present invention.

FIG. 10 is a flow diagram illustrating in greater detail, the steps 120 enacted in the searching process step 106 as shown in FIG. 9. This exemplary algorithm 120 is an exact type of searching process. This first algorithm starts in step 122 and then proceeds to step 124 by calculating a trigram of the input name with spaces. In step 126 a look-up in the trigram index is performed as shown in FIG. 7A. In step 128 for each name code in the name database, a number is assigned for the matching number of trigrams. In step 130, the top set of name scores based on the number of trigrams are selected as is shown in FIG. 7A. In step 132 the names are retrieved that correspond to name codes, and then the process is finished in step 134. This first exemplary searching algorithm creates a first selection group from the employee records database that contains the most likely results to the input search name. This first selection group of names would be set to a predetermined number, for example one hundred (100).

Figure 11:
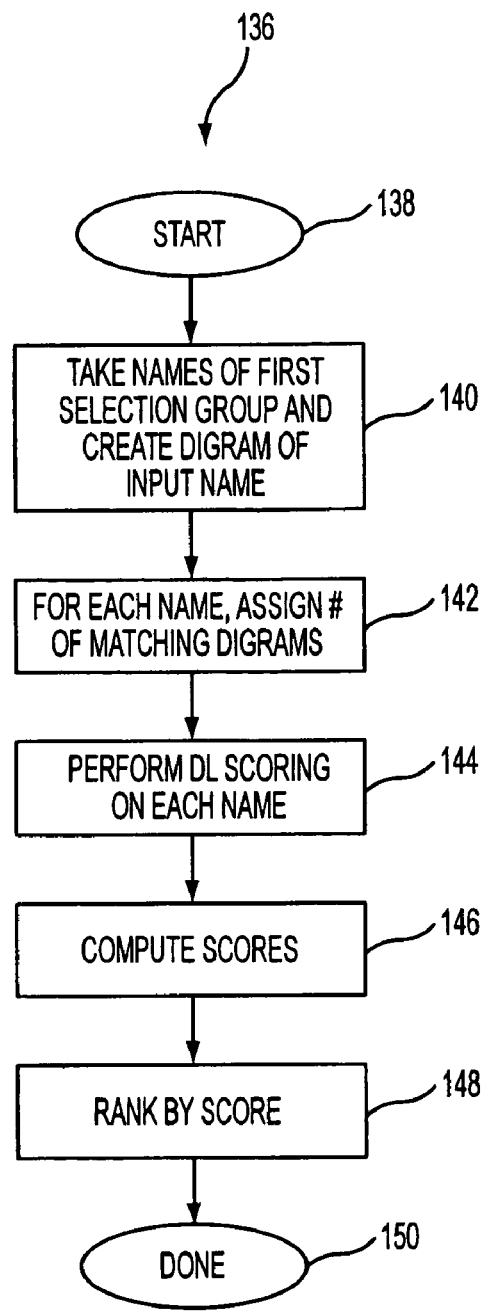
FIG. 11 is a flow diagram illustrating a second exemplary searching algorithm of the present invention.

FIG. 11 is a flow diagram illustrating in greater detail, the steps 136 enacted in the exemplary fuzzy searching process step 108 as shown in FIG. 9.

This second exemplary searching algorithm 136 starts in step 138 and then proceeds to step 140 by creating digrams of the names in the first selection group. In step 142 a number of matching digrams is assigned to each name. In step 144 a (DL) distance score is performed for each name as shown in FIG. 4. In step 146 a total or final score is calculated for each name in the first selection group. The calculation of the scores in steps 140-146 is performed using formulas 1-5 as shown below.

An example of the (DL) distance formula used in step 144 is shown in equation (2) comparing "Udo Kline" to "Udo Klein". Formula (3) calculates a digram score, while formula (5) calculates the final score ranking as would be calculated in step 146. In the formulas below (S) indicates the name character string in question and (T) represents the name character string stored in a table or database.

$$\text{score} = \frac{|\text{digram}(S) \cap \text{digram}(T)|}{|\text{digram}(S)| + |\text{digrams}(T)|} \quad (1)$$

$$d_0 = \min(\text{distance (udo\_klein)udo\_kline), distance (klein}_{udo,\,udo}\text{\_kline})) \quad (2)$$

$$\text{digram\_score} = \frac{|\text{digrams}(S) \cap \text{digrams}(T)|}{|\text{digram}(S)| + |\text{digrams}(T)| - |\text{digrams}(S) \cap \text{digrams}(T)|} \quad (3)$$

$$\text{damerau\_score} = \frac{|S| + |P| - d_0}{|S| + |P| + d_0} \quad (4)$$

$$\text{final\_score} = \sqrt{\text{digram\_scorexdameran\_score}} \quad (5)$$

Finally in step 148 the names are ranked by their computed final scores. The screen shots of FIGS. 4 and 6 illustrate how the rankings are displayed. The user may then select the appropriate name from this ranked list to enable further processing in an HCM application for example. The formulas 1-5, and techniques described in the exemplary algorithms of FIGS. 9-11 may be applied to databases of any language, as there are no limiting or language specific characteristics involved in the above searching and ranking calculations.

Figure 12:
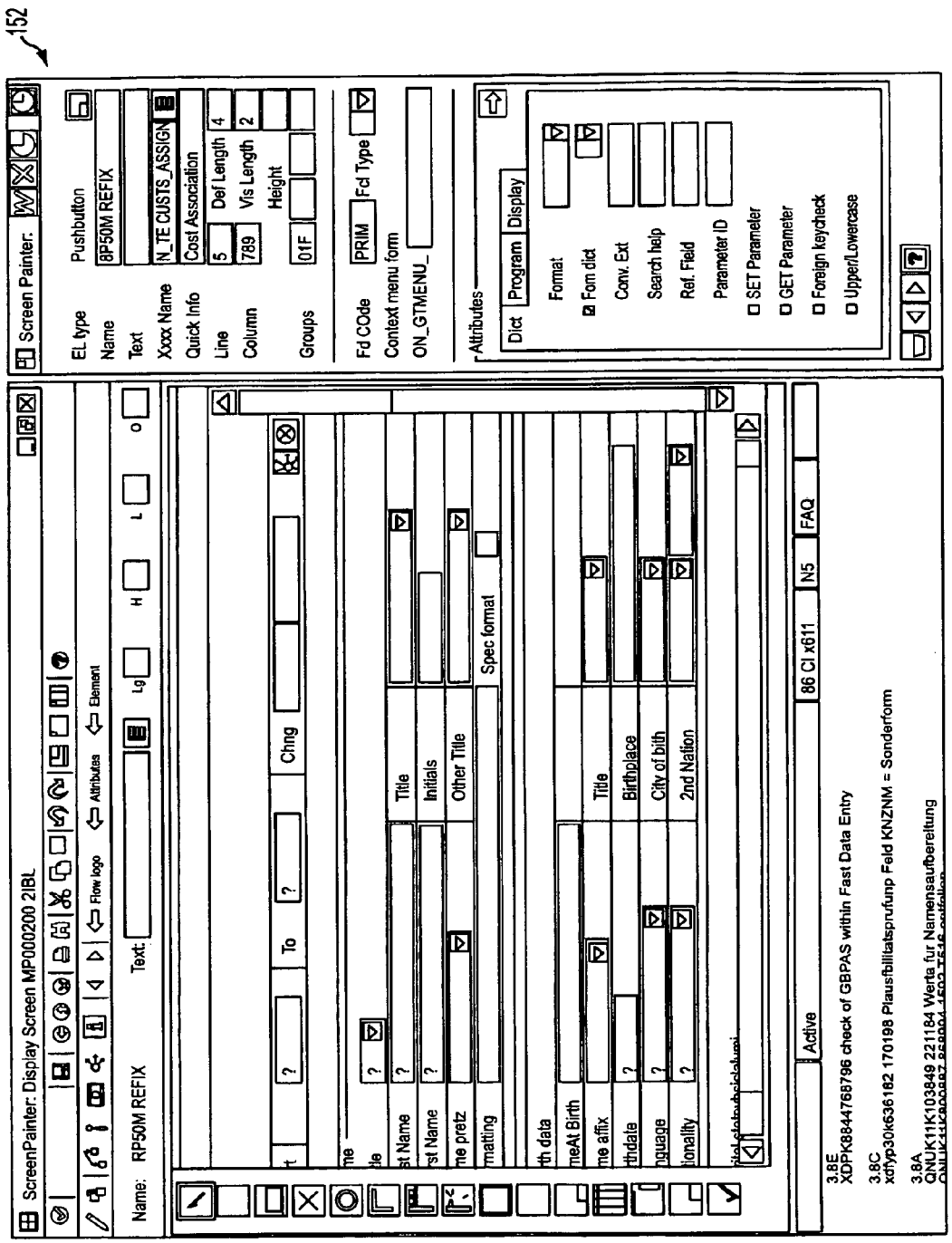
FIG. 12 is a screen shot of an employee name searching system of an embodiment of the present invention.

FIG. 12 is a screen shot 152 provided by an embodiment of the present system, where the user is prompted to enter a selected name for processing by the system. This screen 152 would be a drop-down menu from the screen shown in FIG. 3, where the user enters the name from the ranked list of FIG. 4. The information that may be entered is conventional data that would be found in an employee database, for example, name, title, date of birth, language, nationality, etc.

FIG. 13 is another screen shot 154 employed by an embodiment of the present system. Screen 154 is an example of a user accessing a specific employee record. Once a correct spelling of an employee name is found by the present searching algorithm, the employee information may then be viewed by a user of the system, such as a member of the human resource department. Screen 154 therefore allows conventional employee data to be viewed while running a HCM application program.

Some portions of the detailed description relating to the name searching methods above have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to the apparatus for performing the operations herein. This apparatus may be specially constructed for the required purposes, or it may comprise a general purpose computer selectively activated or reconfigured by a computer program stored in the computer. Such a computer program may be stored (embodied) in a computer (machine) readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein relating to the name searching methods are not inherently related to any particular computer or other apparatus. Various general purpose systems may be used with programs in accordance with the teachings herein, or it may prove convenient to construct more specialized apparatus to perform the required method steps. In addition, the present invention is not described with reference to any particular programming language, and various embodiments may thus be implemented using a variety of programming languages.

The present system as described using the exemplary embodiments as detailed herein, provides an efficient and reliable method for name searching within an employee database of any language, wherein the name is searched by the system as a single text string. The present invention further provides quick results to the user by using multiple searching algorithms such as an exact algorithm and a fuzzy algorithm.

One skilled in the art will appreciate that although specific embodiments of the communications system have been described for purposes of illustration, various modifications can be made without deviating from the spirit and scope of the present invention. For example, the present invention may be applied to many different types of databases and systems that employ different types of data and application programs. Accordingly, the invention is described by the appended claims.

What is claimed is:

1. A computer-implemented method for name searching within an employee records database comprising:
   receiving, by a computer processor, a full name as a text string;
   searching, by the processor, an employee records database for an exact match of the full name;
   forming, by the processor, a first selection group of names from the employee records database using an exact searching algorithm which determines an extent to which portions of a first size of the names of the employee records database match portions of the first size of the text string;
   forming, by the processor, a second selection group of names from the first selection group using a fuzzy searching algorithm which determines an extent to which portions of a second size of the names of the first selection group match portions of the second size of the text string, wherein the second size is smaller than the first size;
   displaying, by the processor and in a display device, the second selection group as a ranked list of names; and
   allowing, by the processor, a selection of a name from the displayed ranked list of names.

2. The method for name searching within an employee records database as in claim 1 wherein the exact searching algorithm searches for trigrams within the employee records database.

3. The method for name searching within an employee records database as in claim 2 wherein the first selection group is limited to a predetermined number of results.

4. A method for name searching within an employee records database as in claim 1 wherein the fuzzy searching algorithm searches for digrams within the first selection group.

5. The method for name searching within an employee records database as in claim 4 wherein the fuzzy searching algorithm calculates a (DL) distance.

6. The method for name searching within an employee records database as in claim 5 wherein the fuzzy searching algorithm calculates a total score.

7. The method for name searching within an employee records database as in claim 6 wherein the fuzzy searching algorithm calculates the total score using a digram score and a (DL) distance score.

8. The method for name searching within an employee records database as in claim 1 wherein the exact searching algorithm and the fuzzy searching algorithm are not enacted if an exact match is found.

9. An apparatus for name searching within an employee records database comprising:
   hardware means for storing an employee records database;
   hardware display means; and
   hardware means for:

receiving a full name as a text string;

forming a first selection group of names from the employee records database using an exact searching algorithm which determines an extent to which portions of a first size of the names of the employee records database match portions of the first size of the text string;

forming a second selection group of names from the first selection group using a fuzzy searching algorithm which determines an extent to which portions of a second size of the names of the first selection group match portions of the second size of the text string, wherein the second size is smaller than the first size;

displaying, via the hardware display means, the second selection group as a ranked list of names; and allowing a selection of a name from the displayed ranked list of names.

10. The apparatus for name searching within an employee records database as in claim 9 wherein the exact searching algorithm searches for trigrams within the employee records database.

11. The apparatus for name searching within an employee records database as in claim 10 wherein the first selection group is limited to a predetermined number of results.

12. The apparatus for name searching within an employee records database as in claim 11 wherein the fuzzy searching algorithm searches for digrams within the first selection group.

13. The apparatus for name searching within an employee records database as in claim 12 wherein the fuzzy searching algorithm calculates a (DL) distance.

14. The apparatus for name searching within an employee records database as in claim 13 wherein the fuzzy searching algorithm calculates a total score.

15. The apparatus for name searching within an employee records database as in claim 14 wherein the fuzzy searching algorithm calculates the total score using a digram score and a (DL) distance score.

16. The apparatus for name searching within an employee records database as in claim 9 wherein the exact searching algorithm and the fuzzy searching algorithm are not enacted if an exact match is found.

17. A computer readable media including code segments for name searching within an employee records database comprising:

a code segment for receiving a full name as a text string;

a code segment for searching an employee records database for an exact match of the full name;

a code segment for forming a first selection group of names from the employee records database using an exact searching algorithm which determines an extent to which portions of a first size of the names of the employee records database match portions of the first size of the text string;

a code segment for forming a second selection group of names from the first selection group using a fuzzy searching algorithm which determines an extent to which portions of a second size of the names of the first selection group match portions of the second size of the text string, wherein the second size is smaller than the first size;

a code segment for displaying the second selection group as a ranked list of names; and a code segment for allowing a selection of a name from the displayed ranked list of names.

18. The computer readable media including code segments for name searching within an employee records database as in claim 17 wherein the exact searching algorithm searches for trigrams within the employee records database.

19. The computer readable media including code segments for name searching within an employee records database as in claim 18 wherein the first selection group is limited to a predetermined number of results.

20. The computer readable media including code segments for name searching within an employee records database as in claim 19 wherein the fuzzy searching algorithm searches for digrams within the first selection group and provides a ranked list of results using a calculated digram score.

* * * * *